July 25, 1967 R. H. COLE ET AL 3,333,113

SWITCHING CIRCUIT PRODUCING OUTPUT AT ONE OF TWO OUTPUTS OR BOTH OUTPUTS

Filed Sept. 3, 1964

INVENTORS
ROBERT H. COLE
ROBERT FEUER

BY Arthur Freilich

ATTORNEY 3,333,113

SWITCHING CIRCUIT PRODUCING OUTPUT AT ONE OF TWO OUTPUTS OR BOTH OUTPUTS

Robert H. Cole and Robert Feuer, Canoga Park, Calif., assignors to The Bunker-Ramo Corporation, Canoga Park, Calif., a corporation of Delaware Filed Sept. 3, 1964, Ser. No. 394,201
9 Claims. (Cl. 307—88.5)

ABSTRACT OF THE DISCLOSURE

Circuit means for use in combination with a source of clock pulses for selectively coupling either a pulse to a first output conductor or simultaneous pulses to first and second output conductors. The clock pulse source is connected through a breakdown impedance to the first output conductor and through a controllable switch to the second output conductor. When the switch is open, the clock pulses break down the impedance and are coupled therethrough to the first output conductor. When the switch is closed, the clock pulses are diverted and coupled to the second output circuit. Buffer means are included for inhibiting the switch from changing state while a clock pulse is being developed.

Figure 1:
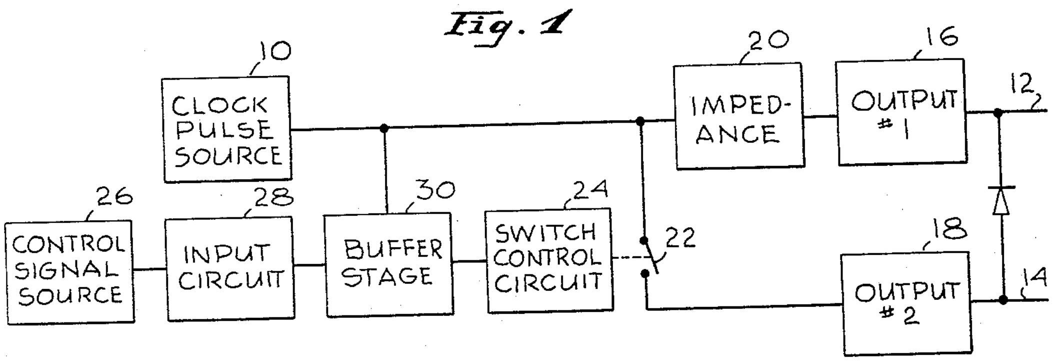

This invention relates generally to data processing apparatus and more particularly to timing circuits for use therein.

Most digital data processing systems are of the synchronous type in which flip-flops are switched and thus information transferred in response to clock pulses. Oftentimes it is necessary to inhibit the application of clock pulses to certain circuits within the system when certain conditions are encountered. A simple way of doing this, of course, would be to apply the clock pulses to those certain circuits through gates controlled by a signal representing those certain conditions. The clock pulses applied to the other circuits could be applied directly from the clock pulse source. Problems arise in attempting to control the circuits in this manner because the gating circuits usually introduce some delay or pulse distortion and thus the same sharp clock pulses provided by the clock pulse source are not exactly simultaneously applied to all of the system circuits. Whereas this does not present a serious problem in slow speed systems, it can be significant in extremely fast systems.

Accordingly, it is an object of the present invention to provide an improved circuit arrangement for normally simultaneously providing two identical output signals and including means for selectively inhibiting one of the output signals.

The occurrence of the certain conditions referred to can be manifested by a logical signal, which, of course, is developed in response to a clock pulse. Since this logical signal is used to inhibit one of the clock pulse output signals, it is important that when it changes during the development of the clock pulse output signal, the change has no effect on the clock pulse output signal currently being developed.

Consequently, it is a further object of the present invention to provide a circuit arrangement in which the change of a control signal during a clock pulse period is prevented from affecting the output signal developed during that period.

In accordance with the present invention, a clock pulse source is connected through an impedance to a first output circuit and through a controllable switch to a second output circuit. The first output circuit is connected to first and second output conductors and the second output circuit is effectively only connected to the second output conductor. When the switch is open, clock pulses provided by the source are coupled through the impedance to the first output circuit. When the switch is closed, the clock pulses are diverted from the first output circuit and coupled to the second output circuit. The switch is controlled in response to a logical control signal.

Inasmuch as the logical control signal changes state in response to a clock pulse, it is desirable to provide means for preventing the switch from responding to the control signal changing during the time a clock pulse is being developed. One of the features of the present invention is the inclusion of a buffer stage which decouples the input circuit from the switch control circuit while a clock pulse is being developed.

Figure 2:
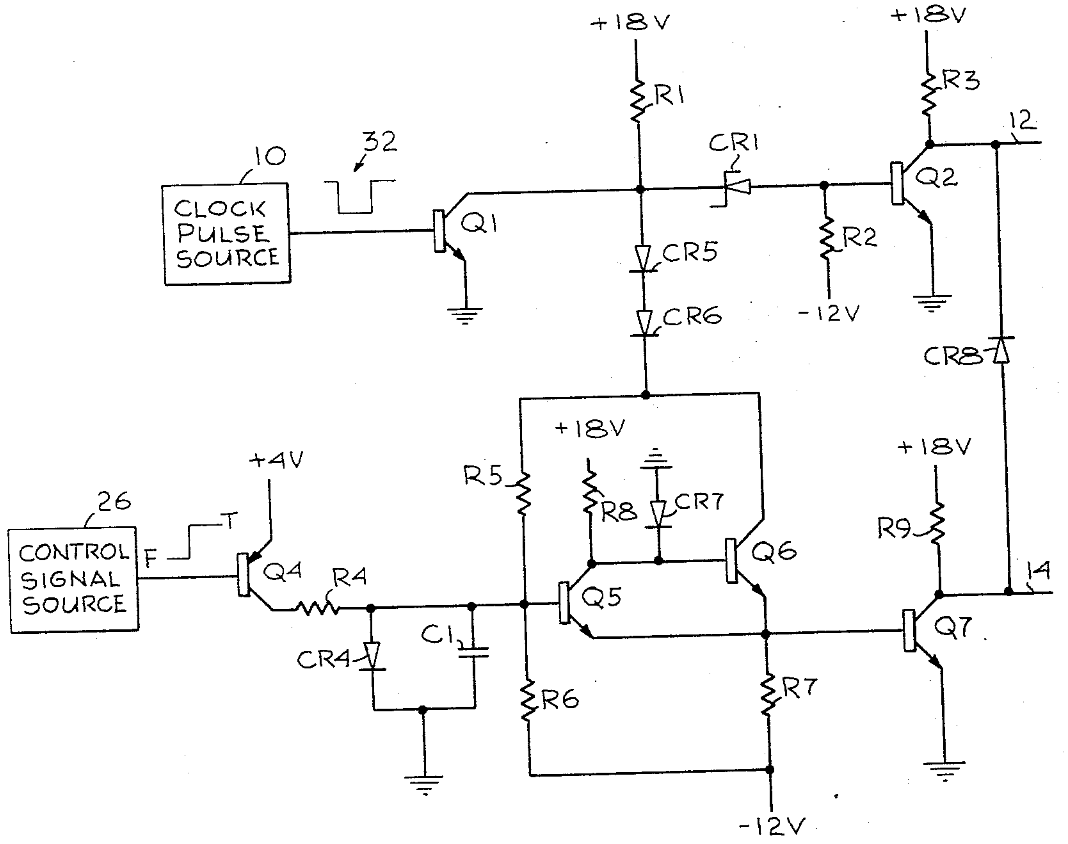

The novel features that are considered characteristic of this invention are set forth with particularity in the appended claims. The invention itself both as to its organization and method of operation, as well as additional objects and advantages thereof, will best be understood from the following description, when read in connection with the accompanying drawings, in which:

FIGURE 1 is a block diagram generally illustrating a circuit arranged in accordance with the present invention; and FIGURE 2 is a schematic circuit diagram illustrating a preferred embodiment of the present invention.

Attention is now called to FIGURE 1 of the drawings which is a block diagram of a circuit arrangement in accordance with the present invention. As noted in the introduction, in most data processing systems, information signals are transferred and circuits are switched in response to clock pulses provided by a source 10. It is sometimes desirable to inhibit the application of clock pulses to certain circuits while other circuits can invariably receive the clock pulses. The circuit arrangement of FIGURE 1 illustrates means for coupling the output of the clock pulse source 10 to output conductors 12 and 14. The circuits which invariably are to receive the clock pulses are connected to the conductor 14, and those circuits which are to receive the clock pulses dependent upon certain conditions are connected to the conductor 12. Thus, in response to each and every pulse provided by the source 10, a negative pulse will be provided on conductor 14 and in response to only certain pulses provided by source 10, a corresponding negative pulse will be provided on conductor 12. When output pulses are provided on both conductors 12 and 14, it is imperative that they coincide in time. Accordingly, when an output pulse is to appear only on conductor 14, the pulse is provided by an output circuit 18. On the other hand, when pulses are to appear on both conductors 12 and 14, they are provided by an output circuit 16 which is coupled to both of the conductors.

The clock pulse source 10 is connected to the output circuit 16 through an impedance 20 and to the output circuit 18 through a switch 22. The switch 22 is controlled by a switch control circuit 24 which is responsive to a control signal provided by a source 26 coupled thereto by an input circuit 28 and buffer stage 30. More particularly, when the control signal source 26 provides a true control signal just prior to a clock pulse, the switch control circuit 24 responds thereto to close switch 22. Consequently, the succeeding pulse developed by source 10 is coupled to the output circuit 18 bypassing the output circuit 16. Output circuit 18 in turn provides clock pulse output signals on conductor 14. On the other hand, if the control signal source 26 couples a false signal to the switch control circuit 24 between clock pulses, the switch 22 is opened to cause the succeeding pulse provided by source 10 to be coupled to the output circuit 16 which will cause a clock pulse output signal to be developed on conductors 12 and 14. Thus, it can be seen that a true logical signal provided by the signal source 26 functions to inhibit the development of the clock pulse output signal on conductor 12.

The control signal source 26 is normally responsive to the clock pulse output signals and therefore is likely to change state during the time that a pulse is being provided by source 10. In this event, the input circuit 28 will store the logical control signal provided by the source 26 until the termination of the clock pulse and will thereafter couple the control signal to the switch control circuit 24. Accordingly, the switching of the control signal source 26 during a clock pulse will have no effect on the clock pulse output signals appearing on conductors 12 and 14.

Attention is now called to FIGURE 2 which illustrates a circuit diagram of a preferred embodiment of the invention. The clock pulse source 10 is defined as a circuit which periodically provides negative-going pulses 32 on its output line. The output line of clock pulse source 10 is connected to the base of an NPN transistor Q1 whose emitter is grounded. The collector of transistor Q1 is connected through a resistor R1 to a source of positive potential, nominally shown as +18 volts. In addition, the collector of transistor Q1 is connected through a breakdown impedence (i.e., a Zener diode CR1) to the base of an NPN transistor Q2 and through resistor R2 to a source of negative potential, nominally shown as −12 volts. The emitter of transistor Q2 is grounded. The collector of transistor Q2 is connected through a resistor R3 to the previously mentioned +18 volt source.

The control signal source 26 is defined as a circuit which selectively provides logically false and logically true signals which are respectively represented by negative and positive voltage levels. The output of the control signal source 26 is connected to the base of a PNP transistor Q4 whose emitter is connected to a source of positive potential, nominally shown as +4 volts. The collector of transistor Q4 is connected through a resistor R4 to the base of an NPN transistor Q5. The base of transistor Q5 is connected through a parallel circuit including diode CR4 and capacitor C1 to ground. In addition, the bease of transistor Q5 is connected through a pair of diodes CR5 and CR6 and a resistor R5 to the collector of previously mentioned transistor Q1. The base of transistor Q5 is further connected through a resistor R6 to a source of negative potential, nominally shown as −12 volts. The collector of transistor Q5 is connected to the base of an NPN transistor Q6 whose emitter is connected through a resistor R7 to the previously mentioned −12 volt source. The emitters of transistors Q5 and Q6 are connected together. The collector of transistor Q5 is further connected through a resistor R8 to the 18 volt source and through a diode CR7 to ground. The collector of transistor Q6 is connected to the junction between resistor R5 and diode CR6.

The emitters of transistors Q5 and Q6 are connected to the base of an NPN transistor Q7 whose emitter is grounded. The collector of transistor Q7 is connected through a resistor R9 to the 18 volt source and to the output conductor 14. In addition, the collector of transistor Q7 is connected through a diode CR8 to the output conductor 12.

Transistor Q6 corresponds to the switch 22 discussed in FIGURE 1. Let it initially be assumed that transistor Q6 is cut off as would be the case if control signal source 26 provides a false or negative signal. Between clock pulses the source 10 applies to a positive potential to the base of transistor Q1 to thus forward bias the transistor and establish a substantially ground potential at the collector thereof. Transistor Q2 would of course be held off and the collector thereof and the conductor 12 will reside at substantially +18 volts. With transistor Q6 cut off, transistor Q7 will be cut off and conductor 14 will also reside at +18 volts. When a clock pulse occurs, meaning that a negative signal is applied to the base of the transistor Q1, transistor Q1 will be cut off and the potential at the cathode of the Zener diode CR1 will rise towards substantially 18 volts to break down the Zener diode and forward bias the transistor Q2. As a consequence, the potential on the collector of transistor Q2 will fall to ground so as to provide a negative pulse on the output conductors 12 and 14. With transistor Q6 cut off, the falling potential at the collector of transistor Q1 will have no effect on the transistor Q7.

Now let it be assumed that the control signal 26 provides a true or positive signal to the base of transistor Q4. Transistor Q4 is thus cut off. Transistor Q1 will be conducting between clock pulses. With transistor Q4 cut off, and with the collector of transistor Q1 residing at substantially ground potential, transistor Q5 will be cut off. Transistor Q6, however, can conduct, its base being clamped to ground through diode CR7. If transistor Q6 is conducting, when a clock pulse is provided by source 10 to cut off transistor Q1, the current provided through resistor R1 can flow through the emitter-collector path of transistor Q6. Thus an insufficient potential will appear at the cathode of Zener diode CR1 to forward bias transistor Q2. However, the increased potential at the emitter of transistor Q6 will forward bias transistor Q7 to thus cause the potential on the collector thereof to fall to ground. As a consequence, a negative pulse will appear on conductor 14. It will be recalled that when transistor Q2 was turned on in response to a clock pulse, negative pulses appeared on both conductor 12 and 14 which pulses were of course coincident. Thus, when pulses are to appear on both conductors 12 and 14, transistor Q2 is turned on, and when pulses are to appear only on conductor 14, transistor Q7 is turned on.

Assume that after the termination of the clock pulse, the signal source 26 again provides a false output signal to forward bias the transistor Q4. A 14 volt potential is thus applied to the collector of transistor Q4, which potential is coupled to the base of transistor Q5. Thus, transistor Q5 becomes forward biased to cut off transistor Q6, inasmuch as the voltage drop across the collector-emitter of the saturated transistor Q5 is insufficient to forward bias the base-emitter junction of transistor Q6. When transistor Q4 had been off-biased and transistor Q6 had been conducting, transistor Q5 had been held off because the base of transistor Q5 was held below the emitter thereof by the greater drop across resistor R5 than through the conducting transistor Q6.

Thus, it should be appreciated that when the source 26 provides a false control signal just prior to a clock pulse, transistor Q4 will be forward biased to in turn forward bias transistor Q5 and cut transistor Q6 off. On the other hand, when the source 26 provides a true control signal just prior to a clock pulse to cut transistor Q4 off, transistor Q5 will in turn be cut off to permit transistor Q6 to conduct. As previously pointed out, when source 10 provides a clock pulse and transistor Q6 is cut off, it will forward bias transistor Q2 to provide negative clock pulse output signals on both conductors 12 and 14. On the other hand, when source 10 provides a clock pulse and transistor Q6 is conducting, transistor Q7 will be forward biased to provide a negative clock pulse output signal only on conductor 14.

Consider the case now in which the signal provided by the source 26 switches from false to true to cut off transistor Q4 during a clock pulse, i.e., when transistor Q2 is conducting. Transistor Q5 which was formerly supplied base current from transistor Q4, will continue to conduct inasmuch as sufficient base current will be provided through resistor R5. Thus, transistor Q6 will remain cut off and the signals appearing on conductors 12 and 14 will not change. When the clock pulse is terminated, the case current to transistor Q5 will terminate and transistor Q5 will cut off, thereby permitting transistor Q6 to turn on prior to the succeeding clock pulse.

Consider the opposite situation in which the signal provided by the source 26 changes from true to false during a clock pulse period to thus turn transistor Q4 on. Transistor Q5 is prevented from going on because both the base and emitter thereof are each effectively a diode drop above ground. When, however, the clock pulse terminates, the current through transistor Q6 will decrease, permitting the potential on the emitter of transistor Q5 to fall thereby turning transistor Q5 on and cutting transistor Q6 off.

From the foregoing, it should be appreciated that a circuit arrangement has been provided herein which is capable of providing clock pulse output signals on either one outputconductor or on two output conductors and in the event the signals are provided on both output conductors, identity between the signals is assured inasmuch as they are initiated by the same transistor output circuit. In addition, it should be appreciated that control circuit means have been provided which assure that the output signals are not affected by changes in the control signal during a clock pulse period.

Although transistor types and potential polarities have been indicated in the preferred embodiment shown herein, it should be appreciated that these are exemplary only and that appropriate reversals could readily be made by those skilled in the art without departing from the spirit or scope of the invention as claimed.

The following table of circuit value is presented as exemplary only, and in no sense is to be considered as limiting:

| | Ohms |
|---|---|
| R1 | 750 |
| R2 | 6,800 |
| R3 | 1,000 |
| R4 | 1,500 |
| R5 | 2,200 |
| R6 | 10,000 |
| R7 | 1,500 |
| R8 | 6,800 |
| R9 | 1,000 |

The embodiments of the invention in which an exclusive property or privilege is claimed are defined as follows:

1. In combination with a source of clock pulses and first and second output conductors, circuit means responsive to each of said clock pulses for selectively applying either a pulse to said first conductor or simultaneous pulses to said first and second conductors, said circuit means comprising:

a signal source selectively providing first and second control signals;

first output circuit means for providing pulses on said first output conductor;

second output circuit means for providing pulses on said first and second output conductors;

impedance means coupling said clock pulse source to said first output circuit means;

switch means coupling said clock pulse source to said second output circuit means; and control circuit means responsive to said first and second control signals for respectively opening and closing said switch means whereby said clock pulses will be coupled through said impedance to said first output circuit means when said switch means is open and will be applied to said second output circuit means when said switch means is closed.

2. The combination of claim 1 including means for locking said first and second output circuit means during the period of each of said clock pulses whereby a change in said control signal during these periods will have no effect on said output circuit means.

3. In combination with a source of clock pulses and first and second output conductors, circuit means responsive to each of said clock pulses for selectively applying either a pulse to said first conductor or simultaneous pulses to said first and second conductors, said circuit means comprising:

first output circuit means for providing pulses on said first output conductor;

second output circuit means for providing pulses on said first and second output conductors;

means including a breakdown impedance coupling said clock pulse source to said first output circuit means;

means including a switch coupling said clock pulse source to said second output circuit means;

a signal source selectively providing first and second control signals; and control circuit means responsive to said first and second control signals for respectively opening and closing said switch, whereby said clock pulses will break down said breakdown impedance and be coupled to said first output circuit means when said switch is open and will be applied to said second output circuit means when said switch is closed.

4. The combination of claim 3 wherein said breakdown impedance comprises a Zener diode.

5. The combination of claim 3 wherein said first output circuit means includes a first transistor and said second output circuit means includes a second transistor, each of said transistors having a base, an emitter, and a collector;

means connecting said first transistor collector to said first and second conductors for applying pulses thereto when said clock pulses are applied to said output circuit; and means connecting said second transistor collector to said second conductor for applying a pulse thereto when said clock pulses are applied to said second output circuit.

6. The combination of claim 3 including a buffer means coupling said source of control signals to said control circuit means;

said buffer means being responsive to the absence of a clock pulse for respectively opening and closing said switch in response to said first and second control signals.

7. The combination of claim 6 wherein said switch comprises a first transistor having a base, a collector, and an emitter;

said buffer means includes a second transistor having a base, a collector, and an emitter; and means connecting said first transistor base-emitter junction between the emitter and collector of said second transistor.

8. The combination of claim 7 including an input circuit comprised of a third transistor;

coupling means connected between said third transistor and said second transistor for controlling the state of said second transistor in response to the state of said third transistor; and means inhibiting said coupling means in the presence of a clock pulse.

9. The combination of claim 8 wherein said first output circuit means includes a fourth transistor and said second output circuit means includes a fifth transistor, each transistor having a base, an emitter, and a collector;

means connecting said fourth transistor collector to said first and second conductors for applying pulses thereto when said clock pulses are applied to said first output circuit; and means connecting said fifth transistor collector to said second conductor for applying a pulse thereto when said clock pulses are applied to said second output circuit.

References Cited

UNITED STATES PATENTS

| | | | |
|---|---|---|---|
| 2,817,772 | 12/1957 | Lee | 307—88.5 |
| 3,155,837 | 11/1964 | Doyle | 307—88.5 |
| 3,183,364 | 5/1965 | Pickering | 307—88.5 |

ARTHUR GAUSS, *Primary Examiner.*

B. P. DAVIS, *Assistant Examiner.*